(12) United States Patent
Ukegawa

(10) Patent No.: US 8,654,372 B2
(45) Date of Patent: Feb. 18, 2014

(54) APPARATUS AND METHOD OF ACTIVATING AND UPDATING CONFIGURATION INFORMATION OF AN IMAGE FORMING APPARATUS

(75) Inventor: Junji Ukegawa, Yamato (JP)

(73) Assignee: Ricoh Company, Limited, Tokyo (JP)

( * ) Notice: Subject to any disclaimer, the term of this patent is extended or adjusted under 35 U.S.C. 154(b) by 1199 days.

(21) Appl. No.: 12/170,869

(22) Filed: Jul. 10, 2008

(65) Prior Publication Data

US 2009/0015867 A1 Jan. 15, 2009

(30) Foreign Application Priority Data

Jul. 10, 2007 (JP) ................................ 2007-180711

(51) Int. Cl.
*G06F 3/12* (2006.01)
(52) U.S. Cl.
USPC ......... 358/1.15; 358/1.13; 358/1.14; 717/170
(58) Field of Classification Search
USPC .......................................................... 365/49
See application file for complete search history.

(56) References Cited

U.S. PATENT DOCUMENTS

| | | | | |
|---|---|---|---|---|
| 6,976,163 | B1 * | 12/2005 | Hind et al. ........................ | 713/2 |
| 7,069,452 | B1 * | 6/2006 | Hind et al. ........................ | 713/2 |
| 7,600,226 | B2 * | 10/2009 | Aiba et al. ..................... | 717/171 |
| 7,730,295 | B1 * | 6/2010 | Lee ................................... | 713/2 |
| 2001/0027469 | A1 * | 10/2001 | Torikai ........................... | 709/202 |
| 2003/0065935 | A1 * | 4/2003 | Neufeld ........................ | 713/200 |
| 2003/0217254 | A1 * | 11/2003 | Page et al. ......................... | 713/2 |
| 2004/0003076 | A1 * | 1/2004 | Hishimoto ..................... | 709/223 |
| 2004/0031029 | A1 * | 2/2004 | Lee et al. ....................... | 717/171 |
| 2004/0120001 | A1 * | 6/2004 | Boldon ......................... | 358/1.15 |
| 2004/0145766 | A1 * | 7/2004 | Sugishita et al. ............. | 358/1.15 |
| 2004/0148379 | A1 * | 7/2004 | Ogura ........................... | 709/223 |
| 2004/0243994 | A1 * | 12/2004 | Nasu .............................. | 717/171 |
| 2004/0268086 | A1 | 12/2004 | Masuyama et al. | |
| 2005/0036348 | A1 * | 2/2005 | Aoyama ......................... | 365/49 |
| 2005/0086654 | A1 * | 4/2005 | Sumi et al. .................... | 717/171 |
| 2005/0141025 | A1 * | 6/2005 | Hanada ........................ | 358/1.15 |
| 2005/0144611 | A1 * | 6/2005 | Chen et al. .................... | 717/168 |
| 2005/0182822 | A1 * | 8/2005 | Daniel et al. .................. | 709/213 |
| 2005/0183141 | A1 * | 8/2005 | Sawada .......................... | 726/16 |
| 2005/0229171 | A1 * | 10/2005 | Henry et al. .................. | 717/168 |
| 2005/0268104 | A1 | 12/2005 | Sugishita et al. | |
| 2006/0074985 | A1 * | 4/2006 | Wolfish et al. ............. | 707/104.1 |
| 2006/0083228 | A1 * | 4/2006 | Ong et al. ..................... | 370/389 |
| 2006/0095433 | A1 * | 5/2006 | Kano ............................. | 707/10 |
| 2006/0119872 | A1 * | 6/2006 | Koizumi ...................... | 358/1.13 |
| 2006/0143286 | A1 * | 6/2006 | Aoki et al. .................... | 709/223 |
| 2006/0221378 | A1 * | 10/2006 | Asahara ...................... | 358/1.14 |
| 2006/0265644 | A1 * | 11/2006 | Koizumi ...................... | 715/522 |
| 2007/0032888 | A1 * | 2/2007 | Hirata et al. .................. | 700/19 |
| 2007/0067430 | A1 * | 3/2007 | Hirata et al. ................. | 709/223 |

(Continued)

FOREIGN PATENT DOCUMENTS

| | | |
|---|---|---|
| JP | 2004-165734 | 6/2004 |
| JP | 2004-318838 | 11/2004 |
| JP | 2004-318871 | 11/2004 |

*Primary Examiner* — Twyler Haskins
*Assistant Examiner* — Nicholas Pachol
(74) *Attorney, Agent, or Firm* — Oblon, Spivak, McClelland, Maier & Neustadt, L.L.P.

(57) ABSTRACT

An apparatus, method, system, and computer program and product each capable of activating an image forming apparatus according to configuration information approved by an authorized user are disclosed.

16 Claims, 9 Drawing Sheets

(56) References Cited

U.S. PATENT DOCUMENTS

| | | | |
|---|---|---|---|
| 2007/0136594 A1* | 6/2007 | Jordan et al. | 713/172 |
| 2007/0283253 A1 | 12/2007 | Asakimori et al. | |
| 2008/0127159 A1* | 5/2008 | Regenmorter | 717/168 |
| 2008/0244553 A1* | 10/2008 | Cromer et al. | 717/168 |

* cited by examiner

APPARATUS AND METHOD OF ACTIVATING AND UPDATING CONFIGURATION INFORMATION OF AN IMAGE FORMING APPARATUS

CROSS-REFERENCE TO RELATED APPLICATIONS

This patent application is based on and claims priority under 35 U.S.C. §119 to Japanese Patent Application No. 2007-180711, filed on Jul. 10, 2007, in the Japanese Patent Office, the disclosure of which is hereby incorporated herein by reference.

FIELD OF THE INVENTION

Example embodiment of the present invention relate generally to an apparatus, method, system, and computer program and product each capable of activating an image forming apparatus, and more specifically to an apparatus, method, system, and computer program and product each capable of activating an image forming apparatus according to configuration information approved by an authorized user.

BACKGROUND

A recent image forming apparatus is capable of reading data from a rewritable recording medium, such as a secure digital (SD) card, hard disk device, electrically erasable programmable read only memory (EEPROM), erasable programmable read only memory (EPROM), and nonvolatile random access memory (NVRAM). For example, the recording medium may store firmware or configuration information such as the option settings. When the power is turned on or when a user instruction is input, the image forming apparatus may read the firmware or the configuration information from the recording medium, and updates the firmware or the configuration of the image forming apparatus to cause the image forming apparatus to perform operation according to the firmware being read from the recording medium or the configuration information being read from the recording medium.

When updating the firmware or the configuration, a problem may arise, for example, due to a conflict between the current firmware or configuration and the firmware or configuration to be updated. The Japanese Patent Application Publication Nos. 2004-318871 and 2004-165734 each describe an image forming apparatus capable of facilitating smooth updating operation even when the trouble is detected. However, the image forming apparatus being described is not capable of detecting the possibility of the conflict before the trouble is detected such that the apparatus it not able to prevent the occurrence of the trouble.

Further, even when the firmware or the configuration of the image forming apparatus is successfully updated, there is no guarantee that the image forming apparatus is free from any trouble. After activation, some functions of the image forming apparatus may become inactivated.

In another example, the firmware or the configuration of the image forming apparatus may be updated by an unauthorized user with the intent of illegally obtaining confidential information stored in the image forming apparatus, such as user information.

SUMMARY

In view of the above and other limitations, there is a need for a technique capable of updating the configuration of the image forming apparatus with improved reliability and robustness.

Example embodiments of the present invention include an image forming apparatus, which includes an approval obtainer and an activation controller. The activation controller obtains first configuration information regarding a first configuration of the image forming apparatus from a removable memory, and second configuration information regarding a second configuration of the image forming apparatus that is currently set as a current configuration of the image forming apparatus. The activation controller may compare between the first configuration information and the second configuration information to generate a comparison result. When the comparison result indicates that the first configuration information and the second configuration information are different from each other, the activation controller may activate only the approval obtainer. When activated, the approval obtainer obtains an approval result indicating whether an approval for updating the current configuration from the second configuration to the first configuration is obtained from an authorized user. Based on the approval result, the activation controller may activate the image forming apparatus with one of the first configuration and the second configuration.

Example embodiments of the present invention include a method of activating an image forming apparatus including: obtaining first configuration information regarding a first configuration of the image forming apparatus from a removable memory; obtaining second configuration information regarding a second configuration of the image forming apparatus from a non-volatile memory; comparing between the first configuration information and the second configuration information to generate a comparison result; activating, when the comparison result indicates that the first configuration information and the second configuration information are different from each other, only an approval obtainer to obtain an approval result indicating whether an approval for updating the current configuration from the second configuration to the first configuration is obtained from an authorized user; and activating the image forming apparatus with one of the first configuration and the second configuration based on the approval result.

In addition to the above-described example embodiments, the present invention may be practiced in various other ways, for example, as an image forming system including the above-described image forming apparatus or a set of computer instructions that causes a computer to perform the above-described activation method.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
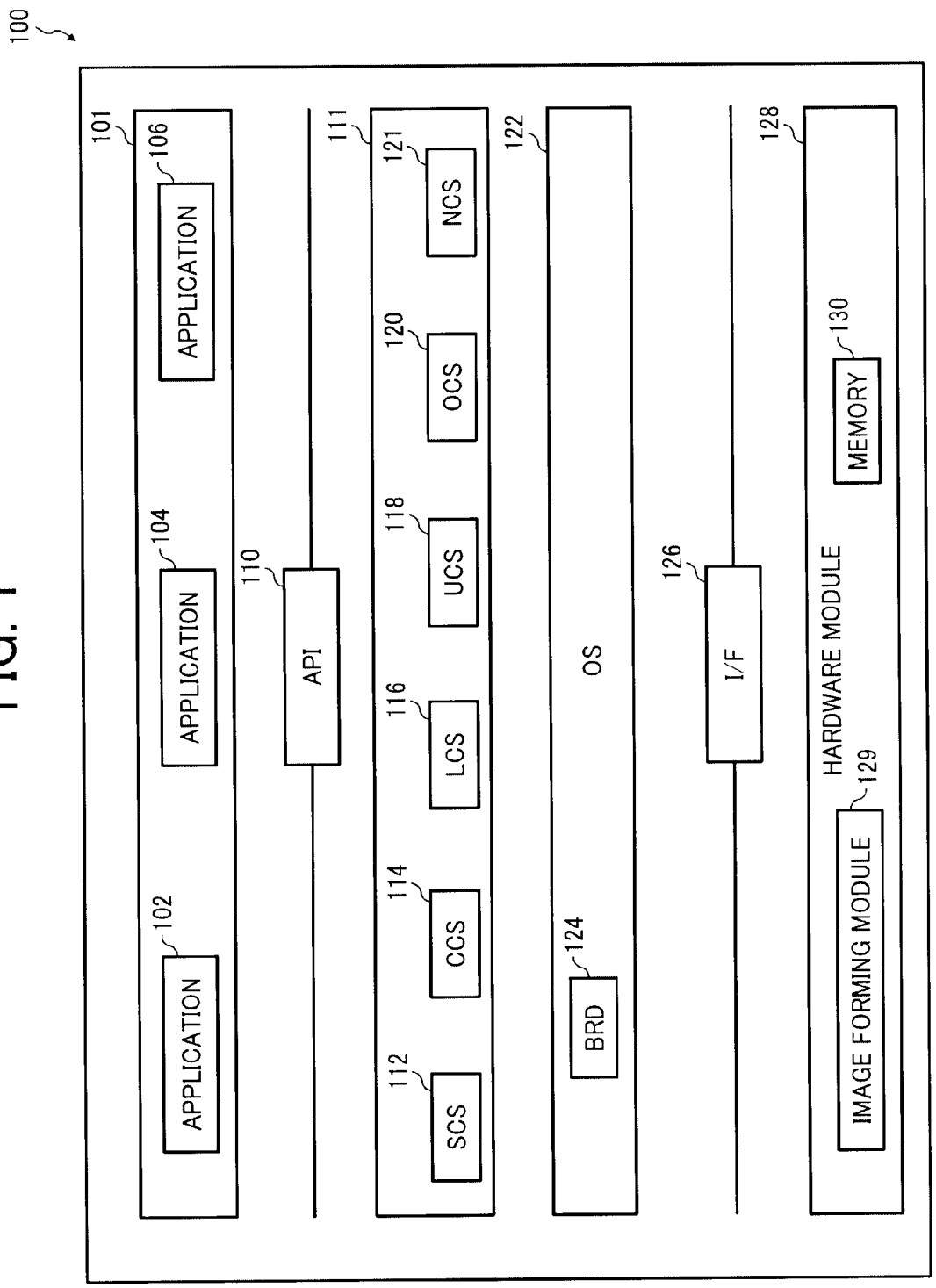
FIG. 1 is a schematic block diagram illustrating the functional structure of an image forming apparatus according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

Referring now to FIG. 1, a functional structure of the image forming apparatus 100 is explained according to an example embodiment of the present invention. In this example, the image forming apparatus 100 is implemented by a multifunctional peripheral apparatus (MFP) capable of providing a plurality of functions, for example, including copying, faxing, printing, scanning, communicating via a network, etc. The image forming apparatus 100 includes an application layer 101 including a plurality of applications 102, 104, and 106, each of which may provide one of the plurality of functions of faxing, printing, and scanning. The applications of the application layer 101 may be determined depending on the functions provided by the image forming apparatus 100. For example, the application layer 101 of FIG. 1 may additionally include a copy application and/or web application. The image forming apparatus 100 further includes an application program interface (API) 110, a middleware system 111 including a plurality of service modules, an operating system (OS) 122, an interface (I/F) 126, and a hardware layer 128 including a group of hardware modules.

Referring to FIG. 1, in one example, at least one of the plurality of applications 102, 104, and 106 of the application layer 101, which may be collectively referred to as the application 102-106, sends a processing result to the middleware system 111 through the API 110. In another example, the application 102-106 performs processing when called by the OS 122. For example, when an instruction is received from the middleware system 111, the OS 122 may call the application 102-106 to start, resume, end, or stop processing according to the instruction.

In this example, the middleware system 111 includes a system control service (SCS) 112, a certificate control service (CCS) 114, a log control service (LCS) 116, a user control service (UCS) 118, an operation control service (OCS) 120, and a network control service (NCS) 121.

Figure 11:
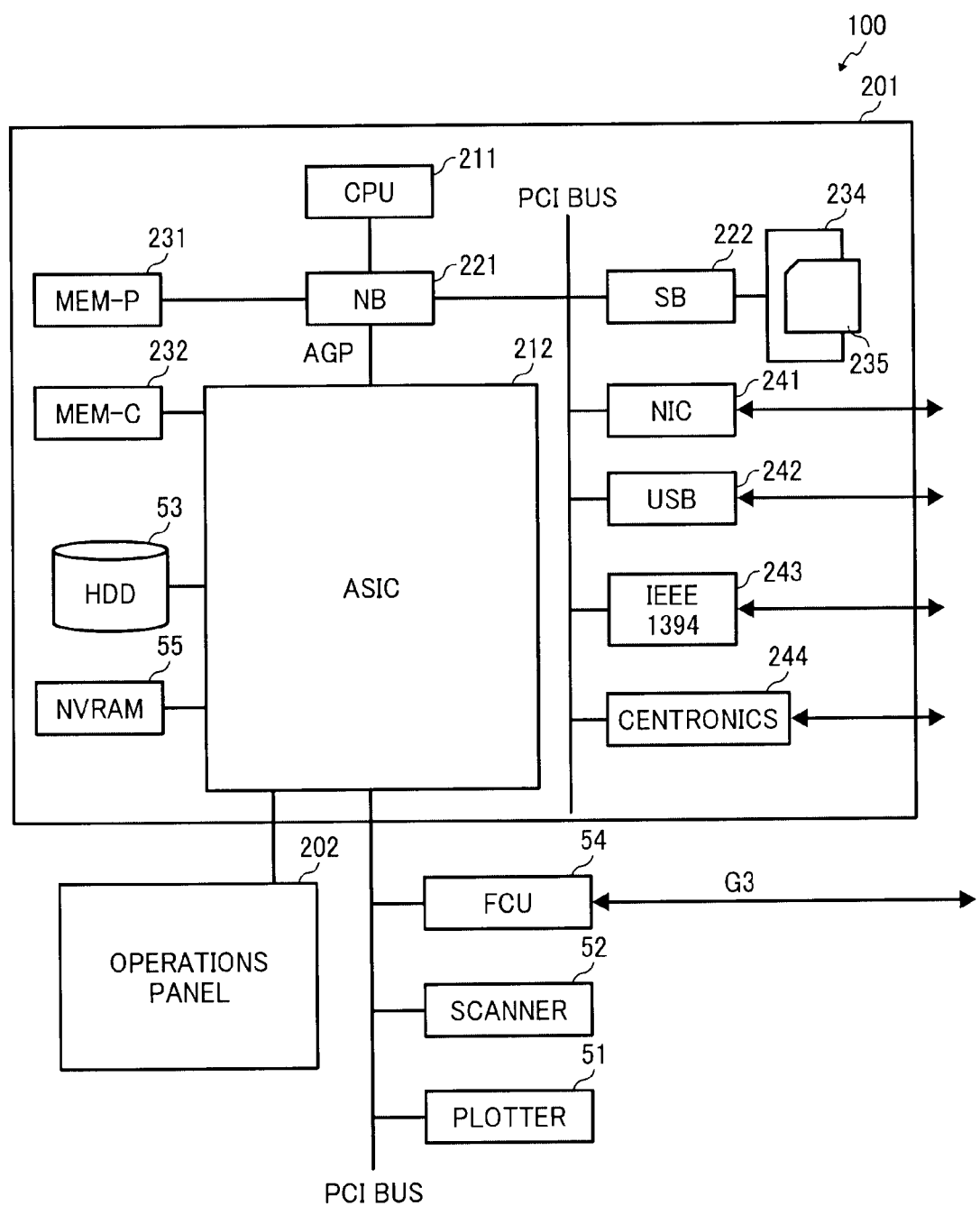
FIG. 11 is a hardware structure of the image forming apparatus shown in FIG. 1, according to an example embodiment of the present invention.

The SCS 112 is a module of controlling the system of the image forming apparatus 100, for example, by processing application management, display management, hardware resource management, or interruption management. The CCS 114 is a module of managing authentication and/or approval of a user and/or administrator. The LCS 116 is a module of managing log data. The UCS 118 is a module of managing user information, for example, an address book. The OCS 120 is a module of controlling an operation panel 202 (FIG. 11) of the image forming apparatus 100. The NCS 12 is a module of managing network communication, such as data transmission or reception via a network, for example, by controlling a network interface such as a network interface controller (NIC) 241 (FIG. 11).

The middleware system 111 may be additionally provided with any other service modules, for example, a memory control service (MCS) capable of controlling a memory resource, an engine control service capable of controlling an engine (ECS), a facsimile control service (FCS) capable of controlling facsimile communication, a system resource management (SRM) capable of controlling system resource, or an image memory handler (IMH) capable of handling image memory. The middleware system 111 communicates with the OS 122.

The OS 122 manages processing or operation performed by the middleware system 111 or the application 102-106. The OS 122 may be based on, for example, UNIX or LINUX. For example, when a processing request is generated by the middleware system 111, an interrupt signal may be generated and transmitted to the OS 122, for example, by serial or parallel communication, through the input/output port of the middleware system 111 and the input/output port of the CPU 211. The OS 122 may be provided with a signal handler, which notifies the corresponding process of the OS 122 that the processing request is generated. Through the interprocess communication, the OS 122 may perform various processing such as data processing, application calling, application termination, or memory management according to the processing request.

In this example, the OS 122 may include a compiler that generate objects based on the programming language such as C, C++, and/or Java, and a linker that assembles the objects generated by the complier into an executable program. Using the functions of the complier and the linker, the OS 122 may activate the application 102-106 written in various languages or manage the application 102-106 through the interprocess communication. For example, when processing is completed by the application 102-106, the OS 122 may notify the middleware system 111 that the processing is completed and/or the result of processing. With this function, the image forming apparatus 100 is able to carry out image formation according to a user instruction input through the application 102-106.

In this example, the OS 122 includes a boot module (BRD) 124, which loads a program into a memory when activating the image forming apparatus 100. The BRD 124 includes a boot loader in compliance with a BOOTP protocol, which may be provided with the OS 122. The BRD 124 may be provided with the function of obtaining configuration information, such as information regarding programs or options, from a removable memory such as a SD card, a smart media memory, or a USB memory. The configuration information obtained from the removable memory may include all items of configuration information that are considered to be necessary for operation or selected items of configuration information that are optionally selected or set by the user. For example, when the removable memory such as a SD card 235 (FIG. 11) is inserted into a memory card slot 234 (FIG. 11), and a user instruction is received through the operation panel 202 (FIG. 11), the BRD 124 may be activated to perform operation of detecting the need for updating the configuration, and obtaining approval from an authorized user when the need for updating is detected.

In one example, when activating the image forming apparatus 100, the BRD 124 may determine whether the removable memory is available, which stores configuration information to generate a determination result. When the determination result indicates that the removable memory is available, the BRD 124 may temporality store configuration information ("the read configuration information"), such as firmware configuration information, read from the removable memory such as the SD card 235 (FIG. 11) in a memory such as a buffer memory. The BRD 124 may further obtain configuration information ("the current configuration information") regarding a current configuration of the image forming apparatus 100 from a nonvolatile memory such as an NVRAM 55 (FIG. 11), for example, according to BOOTP protocol. Alternatively, the current configuration information may be obtained from a hard disk drive (HDD) 53 (FIG. 11) or a USB device via a USB interface 242 (FIG. 11). The current configuration information may be stored in the buffer memory. Examples of the current configuration information may include, but not limited to, configuration information regarding at least one firmware currently installed in the system, such as the program identifier, program version, option settings, and/or security settings. The read configuration information may be previously stored in the removable memory by the manufacturer of the image forming apparatus 100. Alternatively, the read configuration information may be previously stored by the user, for example, using another apparatus, such as in the case of the option settings. Examples of the read configuration information may include, but not limited to, configuration information regarding at least one firmware to be updated, such as the program identifier such as the program name, program version, option settings, and/or security settings. The BRD 124 may compare between the read configuration information and the current configuration information to obtain a comparison result. For example, any one of the read configuration information and the current configuration information may be stored in the form of a list or a table in a manner that the items of the configuration information are organized by type. With this data structure, the difference between the read configuration information and the current configuration information may be easily detected.

When the comparison result indicates that the read configuration information and the current configuration information are different at least partially, in one example, the BRD 124 may only activate a part of the middleware system 111, which is responsible for obtaining approval from an authorized user regarding whether to update the current configuration information with the read configuration information. In this example, the part of the middleware system 111 for obtaining approval includes the SCS 112, the CCS 114, and the UCS 118, which may be collectively referred to as an approval obtainer. Alternatively, the BRD 124 may additionally activate a part of the middleware system 111, which is responsible for updating log data, such as the LCS 116. In such case, the approval obtainer may additionally include the LCS 116. Alternatively, the BRD 124 may additionally activate a part of the middleware system 111, which is responsible for displaying the operation panel 202, such as the OCS 120, for example, in case of obtaining approval via the operation panel 202. In such case, the approval obtainer may additionally include the OCS 120. Alternatively, the BRD 124 may additionally activate a part of the middleware system 111, which is responsible for managing network communication, such as the NCS 121, for example, in case of obtaining approval via the network. In such case, the approval obtainer may additionally include the NCS 121. The other part of the middleware system 111 except for the approval obtainer is inactivated at least until the approval obtaining process performed by the approval obtainer is completed. Since the middleware system 111 is inactivated except for the approval obtainer, the configuration of the image forming apparatus 100 is not changed either manually or automatically unless updating is approved by the authorized user. The approval obtainer may obtain an approval result, which indicates whether approval for updating the current configuration information with the read configuration information from the authorized user is obtained.

The BRD 124 may cause the middleware system 111 to operate according to the determination result, the comparison result, and/or the approval result. In one example, when the determination result indicates that the removable memory is not available, or when the determination result indicates that the removable memory is available and the comparison result indicates that the read configuration information and the current configuration information are the same, the BRD 124 instructs the middleware system 111 to activate the system with the current configuration without updating.

In another example, when the determination result indicates that the removable memory is available, the comparison result indicates that the read configuration information and the current configuration information are different at least partially, and the approval result indicates that updating is approved by the authorized user, the BRD 124 may instruct the middleware system 111 to boot the system with the configuration being updated with the read configuration information. In such case, the current configuration information, which is stored in the nonvolatile memory, is updated with the read configuration information.

In another example, when the determination result indicates that the removable memory is available, the comparison result indicates that the read configuration information and the current configuration information are different at least partially, and the approval result indicates that updating is not approved by the authorized user, the BRD 124 may instruct the middleware system 111 to either activate the system with the current configuration after booting or without booting the system. When the read configuration information is not used for updating, the read configuration information may be deleted from the buffer memory of the image forming apparatus 100.

In another example, the BRD 124 may be previously set so as to activate with the current configuration without performing the operation of obtaining the comparison result and/or approval result, for example, by setting a configuration change detection mode to an invalid mode.

The hardware layer 128 includes an image forming module 129 such as a printer module, a copy module, a fax module, and/or a scanner module, and a memory 130 such as a RAM, ROM, NVRAM 55, SD card 235, USB device, and/or hard disk device (HDD) 53. The hardware module of the hardware layer 128 may be managed by the OS 122 through the I/F 126. In this example, the RAM, which may correspond to a MEM-P 231 and/or MEM-C 232 of FIG. 11, may function as a buffer memory, which temporality stores the read configuration information obtained from the removable memory. Alternatively, the RAM may be provided in the middleware system 111, for example, as a part of an ASIC implementing the middleware system 111. Any one of the NVRAM 55, the HDD 53, the USB device, may function as a nonvolatile memory, which stores the current configuration information.

The image forming apparatus 100 of FIG. 1 may have a hardware structure shown in FIG. 11, for example. The image forming apparatus 100 of FIG. 11 includes a controller 201, the operation panel 202, a fax control unit (FCU) 54, a scanner 52, and a plotter 51. The controller 201 includes a central processing unit (CPU) 211, an ASIC 212, a northbridge (NB) 221, a southbridge (SB) 222, the MEM-P 232, the MEM-C 232, the HDD 53, the NVRAM 55, the memory card slot 234, the NIC 241, the USB interface (USB) 242, an IEEE 1394 device 243, and a Centronics device 244.

The CPU 211 controls operation of the image forming apparatus 100, for example, by executing the middleware system 111 of FIG. 1 as processes on the OS 122. Further, the CPU 211 may execute the application 102-106 of the application layer 101.

The ASIC 212 may be implemented by an integrated circuit capable of performing image processing. The NB 221 connects the CPU 211, the MEM-P 231, the SB 222, and the ASIC 212. The SB 222 connects the NB 221 to a PCI bus and peripheral devices.

The MEM-P 231 may function as a system memory. The MEM-C 232 may function as a local memory. The IEEE 1394 device 243 may be implemented by an interface in compliance with the IEEE 1394 standard. The Centronics device 244 may be implemented by an interface in compliance with the Centronics standard. The SB 222, the NIC 241, the USB interface 242, the IEE 1394 device 243, and the Centronics device 244 are connected to the NB 221 through a PCI bus.

The operation panel 202 may function as a user interface, which allows the user to communicate with the image forming apparatus 100. The operation panel 202 may be provided with a touch panel screen, which allows the user to input an instruction, for example, as described below referring to any one of FIGS. 7 to 10.

Figure 2:
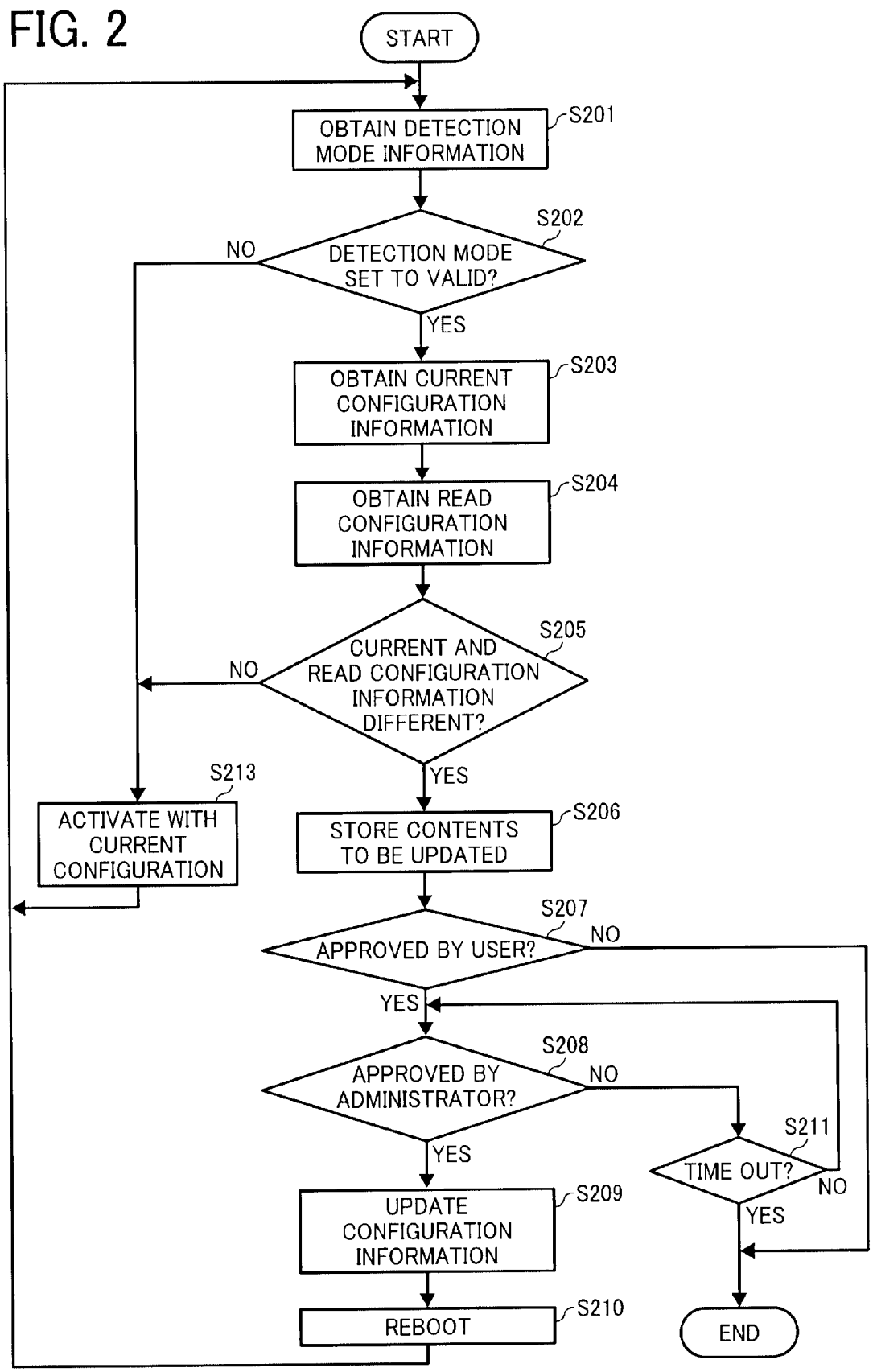
FIG. 2 is a flowchart illustrating operation of activating the image forming apparatus of FIG. 1, performed by the image forming apparatus shown in FIG. 1, according to an example embodiment of the present invention.

Referring now to FIG. 2, operation of activating the image forming apparatus 100, performed by the image forming apparatus 100, is explained according to an example embodiment of the present invention.

At S201, the BRD 124 obtains information indicating the settings of a configuration change detection mode ("the detection mode information"). For example, the detection mode may be previously set according to the settings determined by a manufacturer, such as a service personnel of the manufacturer. In another example, the SCS 112 may change the detection mode according to a user instruction. The detection mode information may be stored in a nonvolatile memory, such as the NVRAM 55 (FIG. 11), for example, as an address flag of the NVRAM.

At S202, the BRD 124 analyzes the detection mode information to determine whether the detection mode is set to a valid detection mode for detecting the configuration change. When it is determined that the detection mode is set to a valid detection mode for detecting the configuration change ("YES" at S202), the operation proceeds to S203. When it is determined that the detection mode is set to an invalid detection mode for not detecting the configuration change ("NO" at S202), the operation proceeds to S213 to activate the image forming apparatus 100 without updating the configuration. At S213, the system may not be rebooted.

At S203, the BRD 124 obtains information regarding the current configuration of the image forming apparatus 100 ("current configuration information"), which may be stored in the NVRAM 55. The BRD 124 may further store the current configuration information in the buffer memory.

At S204, the BRD 124 obtains information regarding the configuration, which may be stored in the recording medium such as the SD card 235 ("read configuration information"), and stores the read configuration information in the buffer memory.

At S205, the BRD 124 compares between the current configuration information and the read configuration information, and determines whether the current configuration information and the read configuration information are different from each other at least partially. When it is determined that the current configuration information and the read configuration information are different ("YES" at S205), the operation proceed to S206. When it is determined that current configuration information and the obtained configuration information are the same ("NO" at S205), the operation proceeds to S213 to activate the system of the image forming apparatus 100 with the current configuration, without updating the current configuration information with the read configuration information. In such case, the configuration information is kept the same as the current configuration information. For example, the image forming apparatus 100 may reboot the system with the current configuration when the power is turned on. In such case, the image forming apparatus 100 may check the status of the system or various devices according to the BOOTP protocol, and perform operation of setting the middleware system 111, loading or executing the application 102-106, etc. In another example, when the image forming apparatus 100 is changed from an energy save mode to an operation mode, the image forming apparatus 100 may load the current environment from the NVRAM 55 onto the RAM, and perform operation of loading the application 102-106.

At S206, the BRD 124 obtains the contents of the read configuration information that are determined to be different from the corresponding contents of the current configuration information, and stores the obtained contents in the buffer memory. For example, the contents may include any data, which is not null, regarding the program identifier, program version, option settings such as option identifier, or security settings.

S207 determines whether updating of the contents of the current configuration information with the contents of the read configuration information is approved by the user. When it is determined that updating is approved by the user ("YES" at S207), the operation proceeds to S208. When it is determined that updating is not approved by the user ("NO" at S207), the operation ends. In this example, the user may approve updating through the operation panel 202 (FIG. 11)

provided in the image forming apparatus 100, for example, by pressing an approval section 706 as described below referring to FIG. 7.

S208 determines whether updating of the contents of the current configuration information with the contents of the read configuration information is approved by the administrator. When it is determined that updating is approved by the administrator ("YES" at S208), the operation proceeds to S209. When it is determined that updating is not approved by the administrator ("NO" at S208), the operation proceeds to S211. In this example, the administrator may approve updating through the operation panel 202 (FIG. 11) provided in the image forming apparatus 100, for example, by pressing a reboot section 908 of FIG. 9 after being authenticated by inputting the login name and the password as described below referring to FIGS. 8 and 9. In another example, the administrator may approve updating through an input device, such as a mouse or a keyboard, of the information processing apparatus that is connected to the image forming apparatus 100. In such case, the image forming apparatus 100 may be provided with the NIC 241 (FIG. 11), which allows communication with the other apparatus through the network such as a local area network, for example, through slave management using the SNMP protocol.

At S209, the SCS 112 updates the current configuration information, which may be stored in the NVRAM 55, with the contents of the read configuration information that are stored in the buffer memory. Alternatively, S209 may be performed by the BRD 124.

At S210, the BRD 124 reboots the image forming apparatus 100 with the updated configuration.

S211 determines whether a predetermined time period passes after the approval by the user is detected at S207. When it is determined that the predetermined time period does not pass ("NO" at S211), the operation repeats S208 to wait for approval from the administrator. When it is determined that the predetermined time period passes ("YES" at S211), the operation ends. For example, the CPU 211 (FIG. 11) may be provided with a time counter capable of counting a counted time period, and a memory storing a reference value. When the counted time period reaches the reference value, which may be set by default or according to the user preference, the CPU 211 may determine that the predetermined time period passes.

The operation of FIG. 2 may be performed in various other ways. For example, at S211, the image forming apparatus 100 may determine whether a number of times of authentication process at S208 reaches a predetermined value. In such case, the CPU 211 may be provided with a retry number counter capable of counting a number of times in which the login name and the password are entered before the administrator is authenticated.

Figure 3:
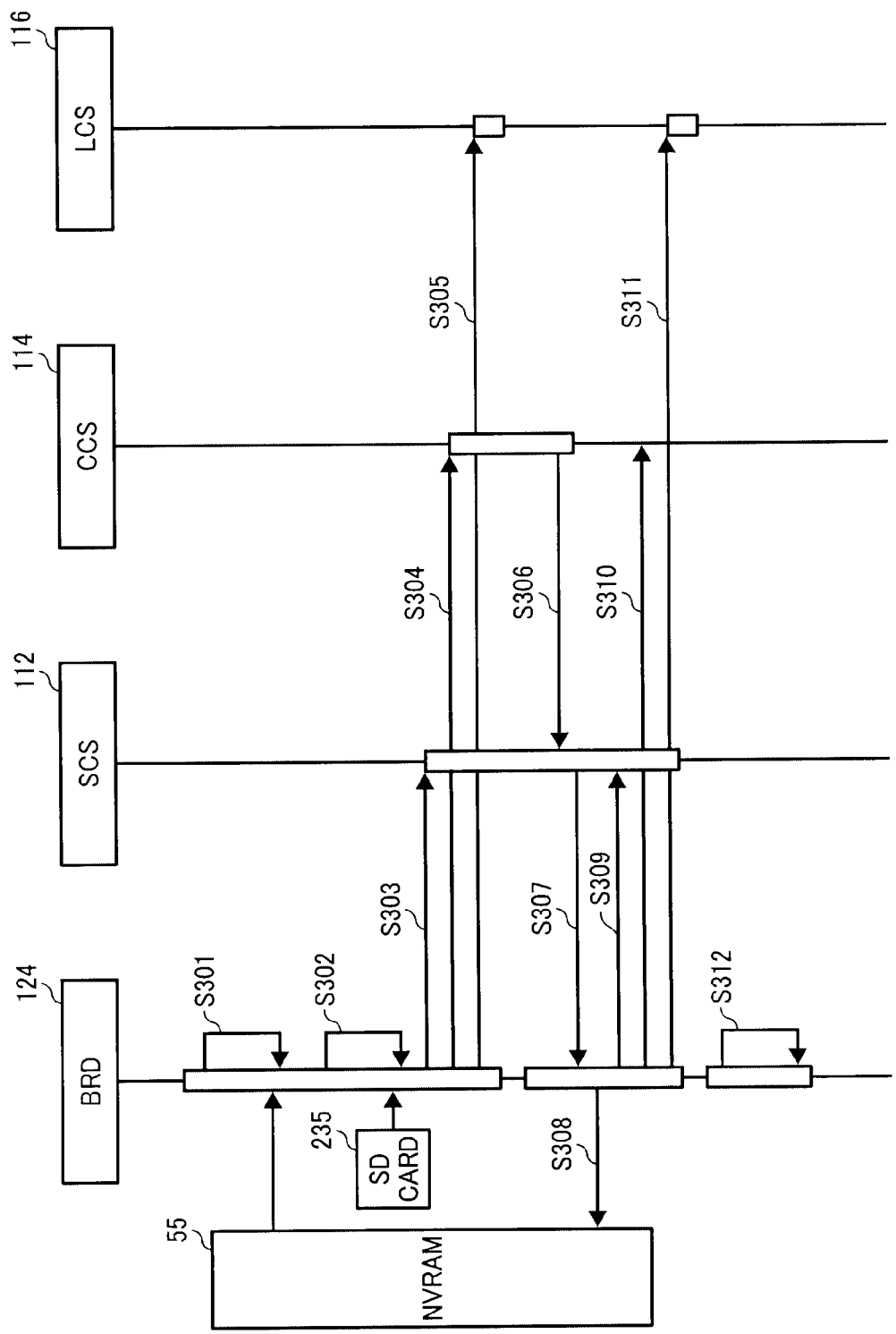
FIG. 3 is a sequence diagram illustrating operation of activating the image forming apparatus of FIG. 1, according to an example embodiment of the present invention.

Referring to FIG. 3, operation of activating the image forming apparatus 100 is explained according to an example embodiment of the present invention. For example, when the image forming apparatus 100 is turned on or when the image forming apparatus 100 receives a user instruction for booting the system of the image forming apparatus 100, the BRD 124 is activated to perform the operation of FIG. 3. Further, in this example, the image forming apparatus 100 is assumed to be activated with the configuration, which is updated using the read configuration information obtained from the removable memory, such as the SD card 235.

At S301, the BRD 124 obtains current configuration information, which is previously stored in the NVRAM 55, from the NVRAM 55.

At S302, the BRD 124 obtains read configuration information from the SD card 235, such as information regarding the option settings, module identifier, program identifier, etc., and stores the read configuration information in the buffer memory. The BRD 124 further compares between the read configuration information and the current configuration information to generate a comparison result.

When the comparison result indicates that the read configuration information and the current configuration information are different from each other at least partially, at S303, the BRD 124 notifies the SCS 112 that the need for updating the configuration is detected. At this time, even when the user instructs activation of the other service modules through the operation panel 202, the SCS 112 prohibits activation of the middleware system 101 except for the approval obtainer, for example, by aborting the user instruction. In this manner, the image forming apparatus 100 remains inactivated at least until when the process of approving updating is completed.

At S304, the BRD 124 notifies the CCS 114 that the need for updating the configuration is detected. When the notification is received, the CCS 114 is activated to start operation of obtaining approval from the user and the administrator. The UCS 118 may be activated along with the activation of the CCS 114. Further, the OCS 120 may be activated to cause the operation panel 202 (FIG. 11) to display a screen for user approval and a screen for administrator approval. When it is determined that updating is approved by both of the user and the administrator, at S306, the CCS 114 notifies the SCS 112 that updating is approved.

At S305, the BRD 124 notifies the LCS 116 that the need for updating the configuration is detected. When the notification is received, the LCS 116 is activated to record the notification as log data, which is stored in a memory of the image forming apparatus 100 such as the NVRAM 55. S303, S304, and S305 may be performed concurrently.

When the notification is received from the CCS 114, at S307, the SCS 112 notifies the BRD 124 that updating is approved. When the notification is received, at S308, the BRD 124 updates the current configuration information stored in the NVRAM 55 with the read configuration information stored in the buffer memory.

At S309, the BRD 124 requests the SCS 112 to reboot with the updated configuration information. At S310, the BRD 124 requests the CCS 114 to reboot with the updated configuration information. At S311, the BRD 124 requests the LCS 118 to reboot with the updated configuration information. The LCS 118 may record rebooting as log data. S309, S310, and S311 may be performed concurrently.

At S312, the BRD 124 reboots the system, and completes with setup operation with the updated configuration information. Specifically, the BRD 124 sets and activates the middleware system 111 using the BOOTP protocol, and loads the application 102-106. After rebooting, the image forming apparatus 100 waits for further instruction from the user.

The operation of FIG. 3 may be performed in various other ways. For example, S301 of obtaining current configuration information, S302 of obtaining read configuration information and comparing configuration information, and S308 of updating may be performed by the SCS 112 according to an instruction received from the BRD 124.

In another example, when the need for updating is detected, the BRD 112 may notify only the SCS 112, which controls operation of other service modules. For example, when notification is received, the SCS 112 is activated to generate an interrupt signal, which causes the CCS 114, the LCS 116, and the UCS 118 to be activated. The OCS 120 or the NCS 121 may be activated.

In a substantially similar manner, the BRD 112 may notify only the SCS 112 that rebooting is requested. When the notification for rebooting is received, the SCS 112 may request the CCS 114 and the LCS 116 to reboot the system.

In this example, the OS 122 and the middleware system 111 communicate with each other through interprocess communication or interrupt. When the number of service modules of the middleware system 111 that receives an instruction from the BRD 124 is reduced, the BRD 124 may perform processing more efficiently.

Figure 4:
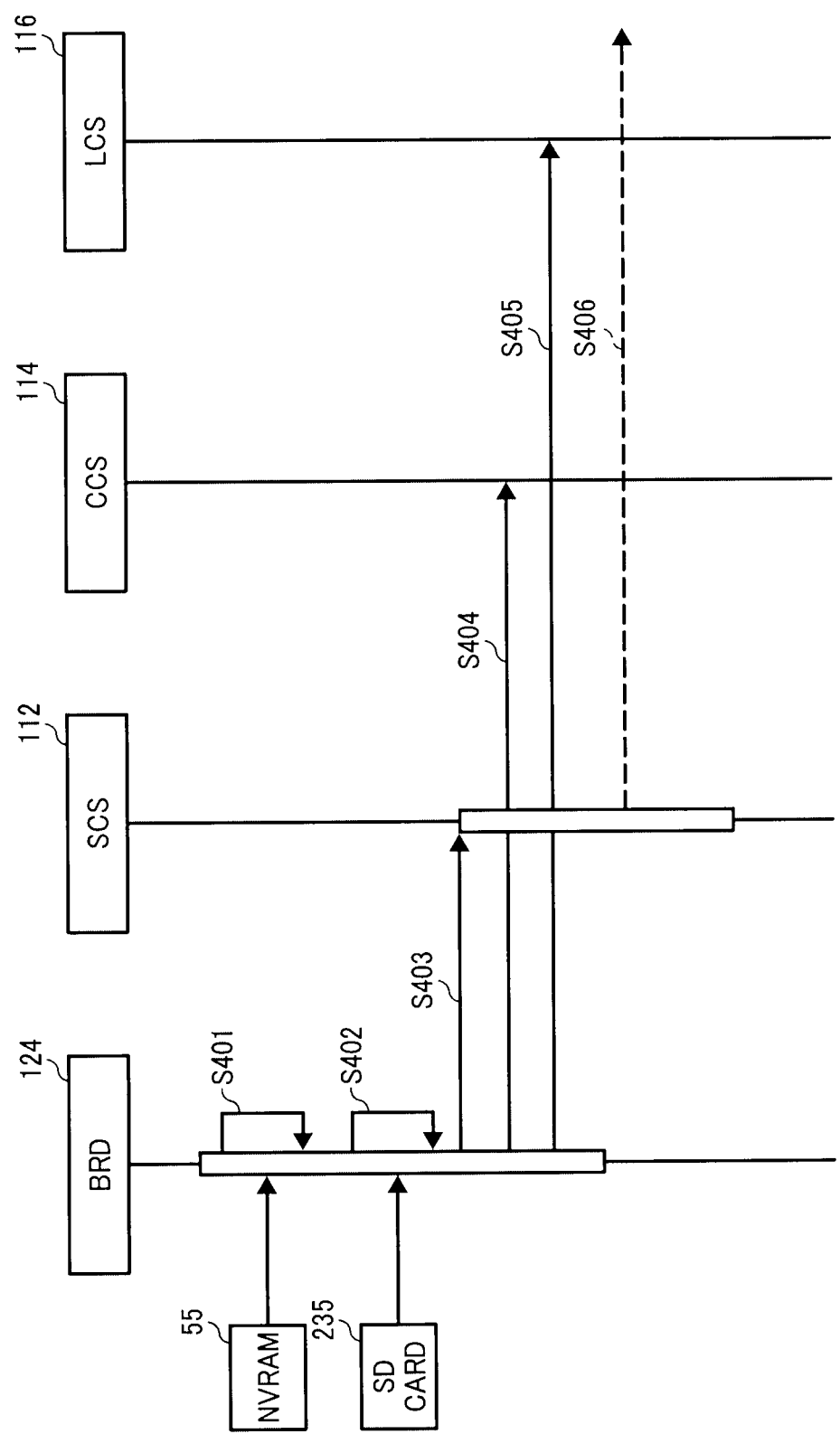
FIG. 4 is a sequence diagram illustrating operation of activating the image forming apparatus of FIG. 1, according to an example embodiment of the present invention.

Referring now to FIG. 4, operation of activating the image forming apparatus 100 is explained according to an example embodiment of the present invention. For example, when the image forming apparatus 100 is turned on or when the image forming apparatus 100 receives a user instruction for booting the system of the image forming apparatus 100, the BRD 124 is activated to perform the operation of FIG. 4. Further, in this example, the image forming apparatus 100 is assumed to be activated with the current configuration information previously stored in the NVRAM 55.

At S401, the BRD 124 obtains current configuration information from the NVRAM 55.

At S402, the BRD 124 obtains read configuration information, which may be previously stored in the SD card 235, from the SD card 235. The BRD 124 further compares between the current configuration information and the read configuration information to generate a comparison result.

When the comparison result indicates that the current configuration information and the read configuration information are the same, at S403, the BRD 124 notifies the SCS 112 that the need for updating is not detected. When the notification is received, at S406, the SCS 112 may notify the other service modules of the middleware system 101 that activation or initialization is requested. The SCS 112 may additionally notify the OS 122 to cause the OS 122 to start loading an application or calling a method with the current configuration.

At S404, the BRD 124 notifies the CCS 114 that the need for updating is not detected.

At S405, the BRD 124 notifies the LCS 116 that the need for updating is not detected. When the notification is received, the LCS 116 is activated to record, as long data, that the apparatus 100 is activated without updating the configuration information. S403, S404, and S405 may be performed concurrently.

The operation of FIG. 4 may be performed in various other ways. For example, when no need for updating is detected, the BRD 112 may notify only the SCS 112. In such case, the SCS 112 may notify the CCS 114 and the LCS 116 that no need for updating is detected.

Figure 5:
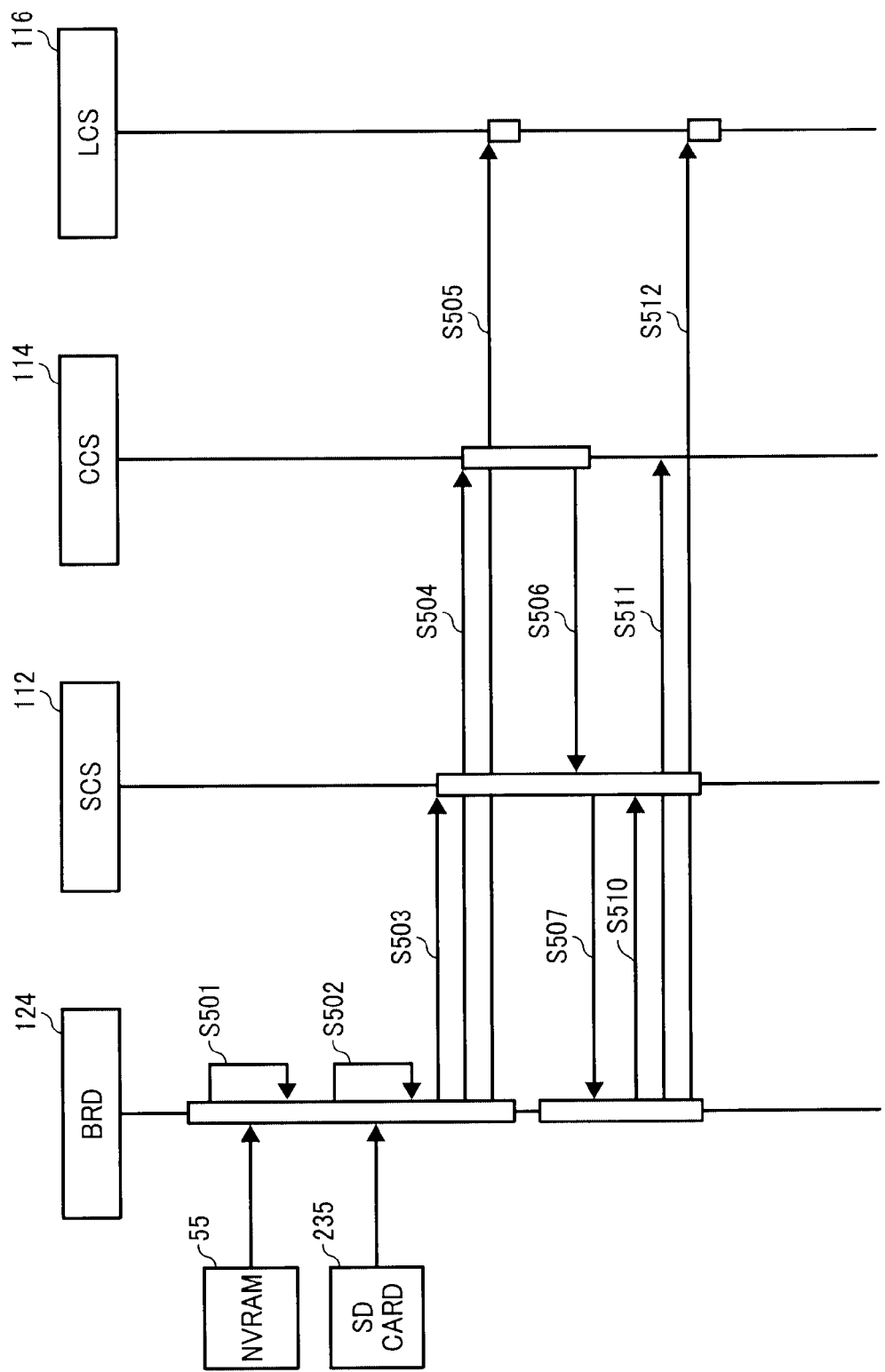
FIG. 5 is a sequence diagram illustrating operation of activating the image forming apparatus of FIG. 1, according to an example embodiment of the present invention.

Referring now to FIG. 5, operation of activating the image forming apparatus 100 is explained according to an example embodiment of the present invention. For example, when the image forming apparatus 100 is turned on or when the image forming apparatus 100 receives a user instruction for booting the system of the image forming apparatus 100, the BRD 124 is activated to perform the operation of FIG. 5. Further, in this example, the image forming apparatus 100 is assumed to be activated with the current configuration without updating, as updating is not approved by at least the administrator.

At S501, the BRD 124 obtains current configuration information from the NVRAM 55.

At S502, the BRD 124 obtains read configuration information from the SD card 235. The BRD 124 further compares between the current configuration information and the read configuration information to generate a comparison result.

When the comparison result indicates that the current configuration information and the read configuration information are different, at S503, the BRD 124 notifies the SCS 112 that the need for updating is detected. At this time, even when the user instructs activation of the other service modules through the operation panel 202, the SCS 112 prohibits activation of the middleware system 111 except for the approval obtainer, for example, by aborting the user instruction. In this manner, the image forming apparatus 100 remains inactivated at least until when the process of approving updating is completed.

At S504, the BRD 124 notifies the CCS 114 that the need for updating the configuration is detected. When the notification is received, the CCS 114 is activated to start operation of obtaining approval from the user and the administrator. The UCS 118 may be activated along with the activation of the CCS 114. Further, the OCS 120 may cause the operation panel 202 (FIG. 11) to display a screen for user approval and a screen for administrator approval in a substantially similar manner as described above referring to S304 of FIG. 3. When it is determined that updating is not approved by both of the user and the administrator, at S506, the CCS 114 notifies the SCS 112 that updating is not approved. For example, it is assumed that, in this example, approval from the user is obtained while approval from the administrator is not obtained at least within a predetermined time period previously set.

At S505, the BRD 124 notifies the LCS 116 that the need for updating the configuration is detected. When the notification is received, the LCS 116 is activated to record the notification as log data. S503, S504, and S505 may be performed concurrently.

When the notification is received from the CCS 114, at S507, the SCS 112 notifies the BRD 124 that updating is not approved. When the notification is received, at S510, the BRD 124 requests the SCS 112 to terminate operation of initialization. At this time, the SCS 112 may cause the OCS 120 to display a message to the user, which indicates that updating is not approved. At S511, the BRD 124 requests the CCS 114 to terminate operation of initialization. At S512, the BRD 124 requests the LCS 116 to terminate operation of initialization. When terminating, the BRD 124 may release a hardware resource such as the memory.

The operation of FIG. 5 may be performed in various other ways. For example, S501 of obtaining current configuration information, and S502 of obtaining read configuration information and comparing configuration information may be performed by the SCS 112 according to an instruction received from the BRD 124.

In another example, when the need for updating is detected, the BRD 112 may notify only the SCS 112, which controls operation of other service modules. In a substantially similar manner, the BRD 112 may notify only the SCS 112 that termination is requested.

As described above referring to any one of FIGS. 3, 4, and 5, the image forming apparatus 100 updates the current configuration only when updating is approved by the authorized user, such as the administrator of the image forming apparatus 100. Since the administrator is expected to be previously notified with the need of updating or the contents to be updated. For example, the administrator is usually notified of the version number when the firmware is to be updated. By checking the version number of the firmware being detected, which may be displayed on the operation panel 202 or the administrator's information processing apparatus, the administrator may easily determine whether to approve updating of the firmware. This may prevent a trouble, which may be caused by the conflict between the current configuration and the configuration to be updated, thus allowing smooth updating operation for the user. This may further prevent any unauthorized user from updating the current configuration such that the unauthorized user becomes able to impersonate the administrator with the intent to obtain confidential information, such as user information, from the image forming apparatus 100 or any other apparatus connected to the image forming apparatus 100. With this function, the risk of information leakage may be suppressed, while providing higher robustness and security.

Figure 6:
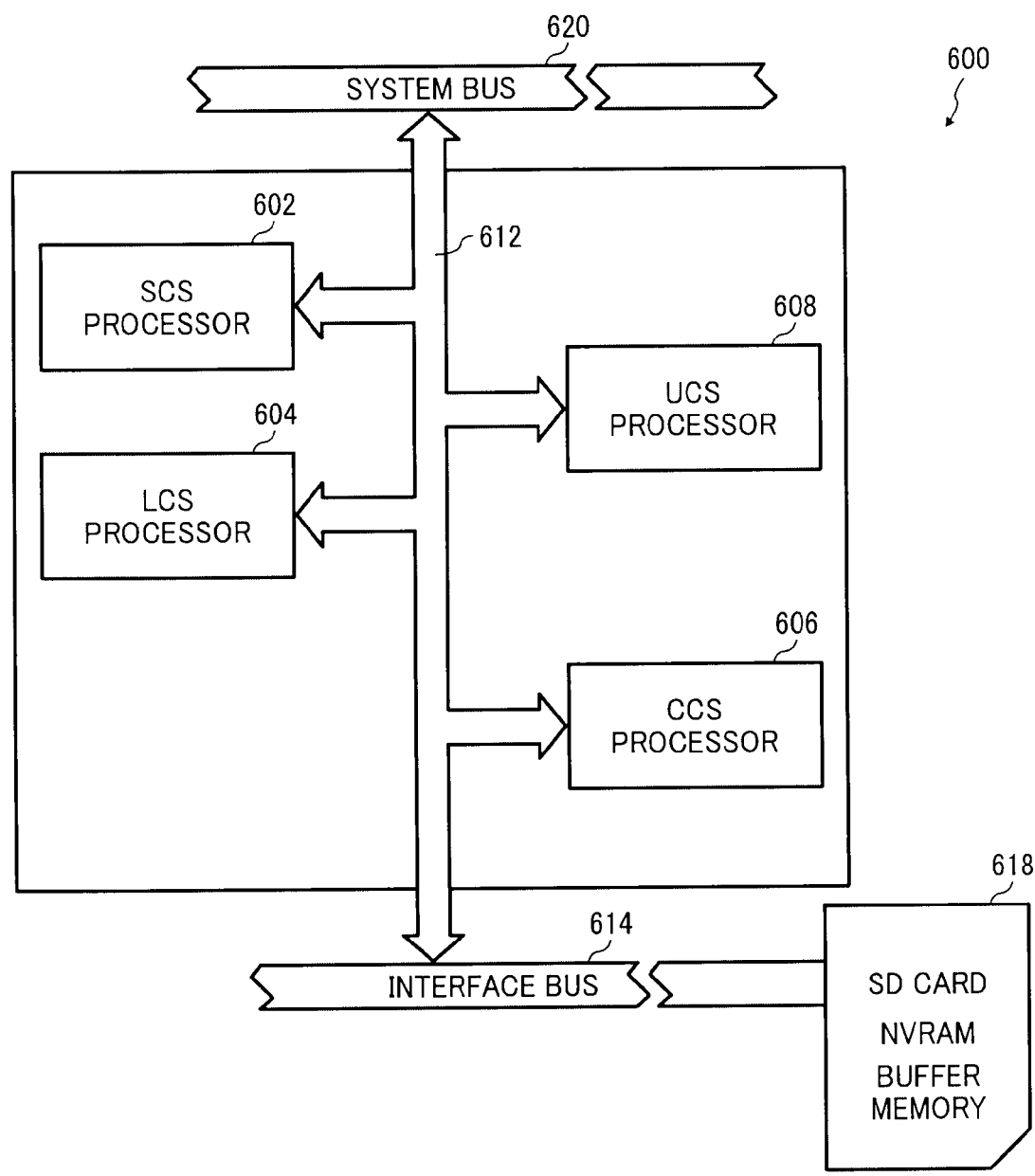
FIG. 6 is an example structure of a control circuit of a middleware system of the image forming apparatus shown in FIG. 1.

Referring to FIG. 6, the structure of a control circuit 600 of the middleware system 111, which corresponds to the approval obtainer, is explained according to an example embodiment of the present invention. The control circuit 600 of FIG. 6 includes a SCS processor 602, an LCS processor 604, a CCS processor 606, and a UCS processor 608, which may be each implemented as an ASIC, or may be collectively implemented as a single ASIC. The SCS processor 602, LCS processor 604, CCS processor 606, and UCS processor 608 may be provided on a single board or substrate, for example, in a flash ROM. By providing the control circuit 600 on the ROM of the substrate, the user may be prevented from changing the structure of the control circuit 600. The SCS processor 602, LCS processor 604, CCS processor 606, and UCS processor 608 may communicate with the OS 122 to manage application calling or data transmission/reception.

Further, the SCS processor 602, LCS processor 604, CCS processor 606, and UCS processor 608 are connected or coupled with one another via an internal bus 612 such that the processor 602, 604, 606, and 608 are communicable with one another. The internal bus 612 is further connected to a system bus 620 and an interface bus 614. The interface bus 614 is connected through an interface to a storage 618, such as NVRAM, SD card, or buffer memory to allow the control circuit 600 to read data from or write data into the storage 618.

When the image forming apparatus 100 determines that it is accessed by a user, and further determines that the detection mode is set to a valid detection mode, the control circuit 600 is notified to be activated independently from the other modules of the middleware system 111 to start operation of approval process. For example, the control circuit 600 may receive an interruption signal generated by the BRD 124 to activate the processors 602, 604, 606, and 608 substantially at the same time. In another example, the SCS controller 602 may firstly receive an interruption signal generated by the BRD 124 to be activated. The SCS controller 602 may then activate the other modules such as the processors 604, 606, and 608. When it is determined that updating is not approved or approval is not successfully completed, the SCS processor 602 does not notify the middleware system 111 except for the control circuit 600 such that the use of the image forming apparatus 100 is restricted.

Figure 7:
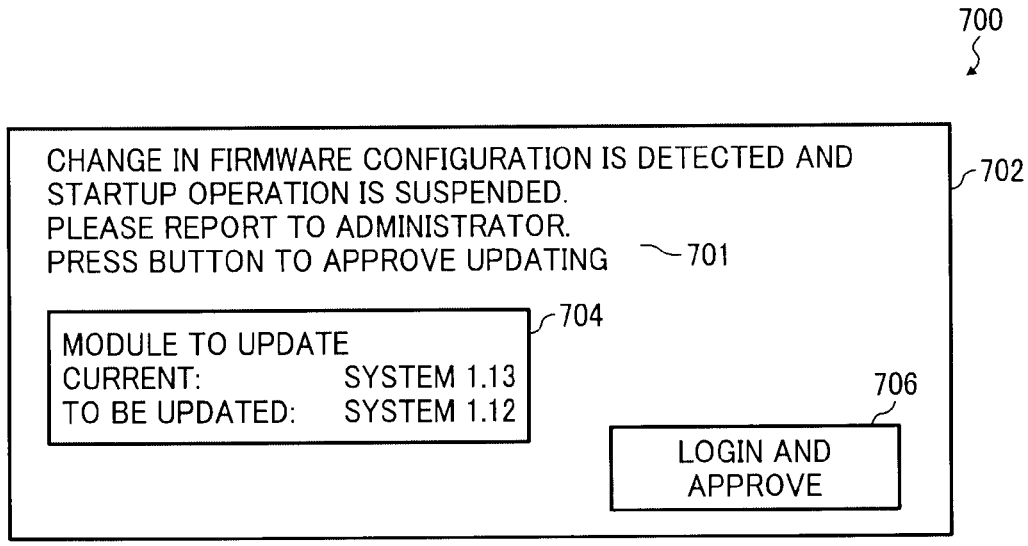
FIG. 7 is an example screen for obtaining user approval, which is displayed by the image forming apparatus of FIG. 1.

FIG. 7 illustrates an example screen 700 for obtaining user approval, which may be displayed on the operation panel 202 under control of the CCS 114. The user approval screen 700 of FIG. 7 may include a display area 702, which includes a message section 701, an update information section 704, and the approval section 706. The message section 701 displays a message indicating that the need for updating is detected and updating requires approval from the user. The update information section 704 displays information regarding the contents to be updated, for example, the identification of the module subjected to the need for updating, the current version number of the module, and the version number to be updated. The approval section 706 allows the user to approve updating, which is displayed in the update information section 704, when it is pressed or touched. In this example, the user is assumed to be authenticated in prior to displaying the user approval screen 700 of FIG. 7.

Figure 8:
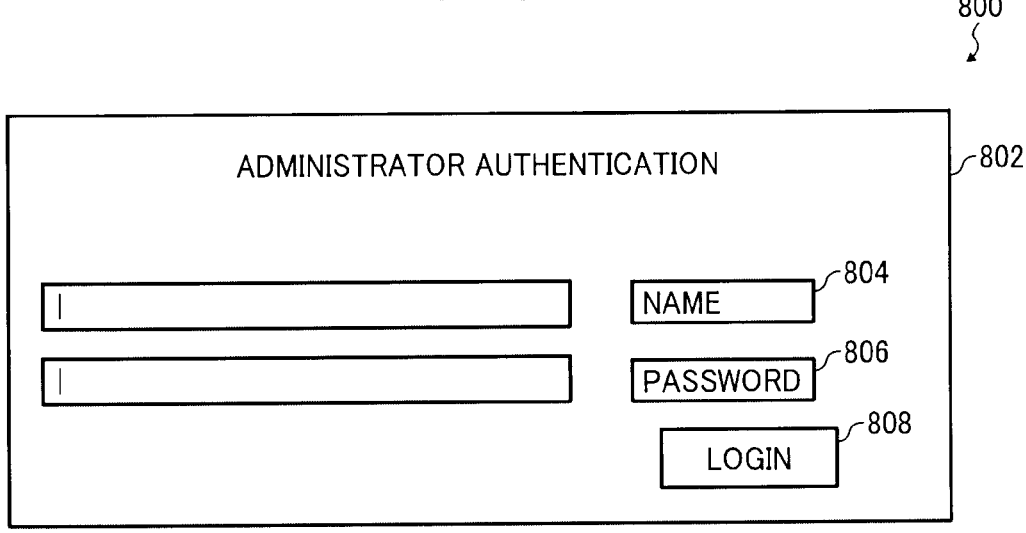
FIG. 8 is an example screen for obtaining administrator approval, which is displayed by the image forming apparatus of FIG. 1.

FIG. 8 illustrates an example screen 800 for authenticating the administrator, which may be displayed on the operation panel 202 under control of the CCS 114. The administrator approval screen 800 of FIG. 8 includes a display area 802, which includes a login name section 804, a password section 806, and a login section 808. The login name section 804 allows the user, which is assumed to be the administrator, to input the login name. The password section 806 allows the user, which is assumed to be the administrator, to input the password corresponding to the login name. After inputting the login name and the password, the user may select the login section 808 to allow the image forming apparatus 100 to authenticate whether the user who has input the login name and the password is the administrator.

In another example, the image forming apparatus 100 may allow the administrator to perform authentication operation at the information processing apparatus that is connected to the image forming apparatus 100. In such case, the image forming apparatus 100 may send a trap command based on the SNMP protocol to the information processing apparatus of the administrator. The information processing apparatus of the administrator may function as a master node. Specifically, when updating is approved by the user, the image forming apparatus 100 may send a message requesting for approval from the administrator to the information processing apparatus of the administrator. When the message is received, the information processing apparatus of the administrator may display a window, which is substantially similar to the display area 802. The login name and the password input by the administrator may be sent to the image forming apparatus 100. This may prevent the user, who is at the image forming apparatus 100, from seeing the login name or the password of the administrator while the administrator inputs the login name or the password.

Figure 9:
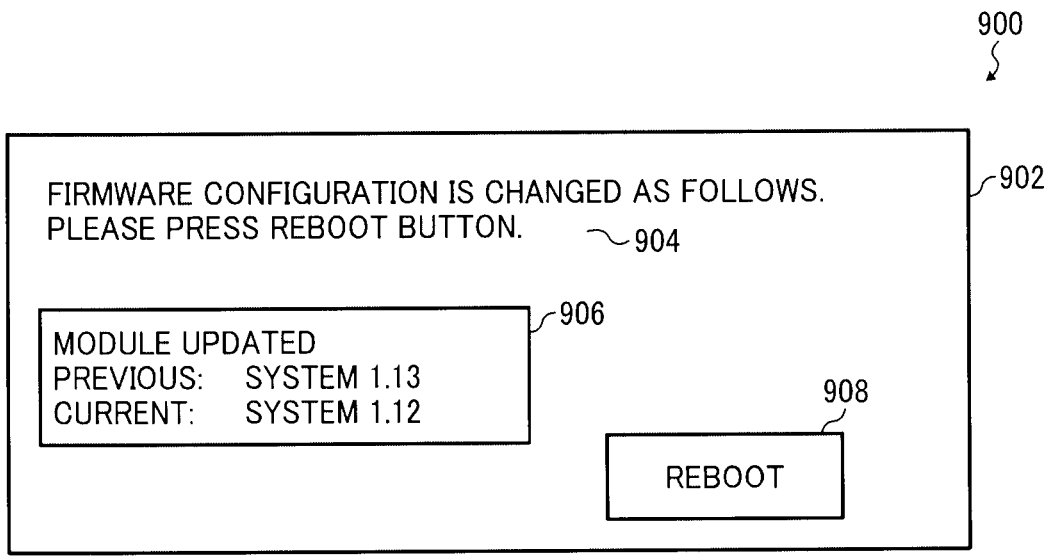
FIG. 9 is an example screen for allowing reboot after updating, which is displayed by the image forming apparatus of FIG. 1.

FIG. 9 illustrates an example screen 900 for allowing the user or the administrator to reboot the system after approval from both of the user and the administrator is obtained. The rebooting instruction screen 900 of FIG. 9 may be displayed on the operation panel 202 after completion of approval process by the CCS 114. For example, when the SCS 112 receives notification from the CCS 114 that approval from the administrator is obtained, the operation panel 202 may be caused to display the rebooting instruction screen 900 of FIG. 9. The rebooting instruction screen 900 of FIG. 9 includes a display area 902, which includes a message section 904, an update information section 906, and the reboot section 908. The message section 904 displays a message indicating that the current configuration is updated and rebooting is necessary to reflect the updated system. The update information section 906 displays information regarding the contents being updated, for example, the previous system version before updating, and the current system version after updating. With this information, the user is able to reconfirm the contents being updated. The reboot section 908 allows the user to reboot the system, when it is pressed or touched. When the reboot section 908 is selected, the BRD 124 may start activating the service modules by referring to the current configuration information stored in the NVRAM 55, such as the module identifier or the option identifier. After activation of the system, the user is able to use the image forming apparatus 100 with the current configuration, which is updated to reflect the configuration information stored in the removable memory.

Figure 10:
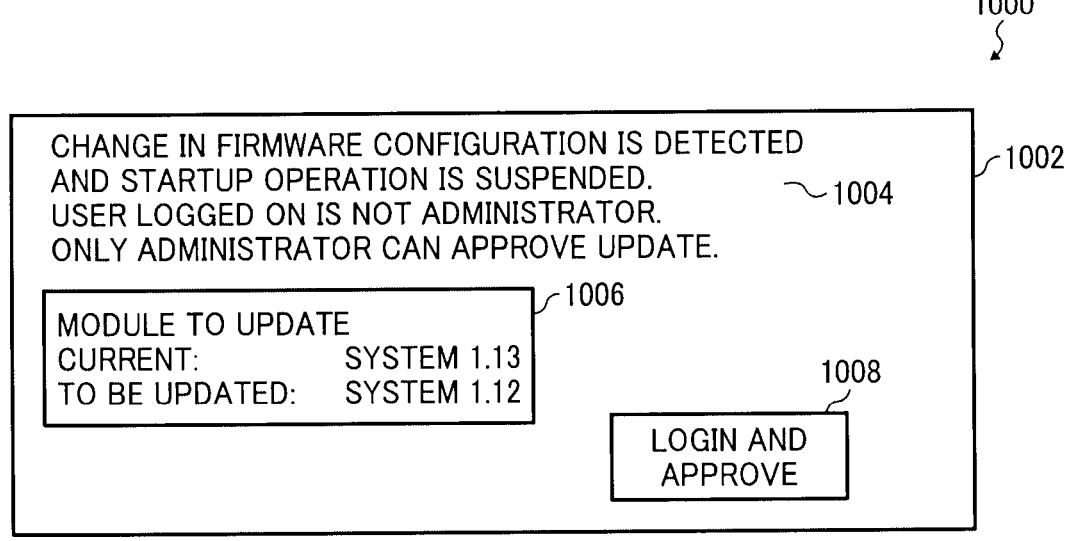
FIG. 10 is an example screen for reporting that administrator approval is not successful, which is displayed by the image forming apparatus of FIG. 1.

FIG. 10 illustrates an example screen 1000 for notifying the user that approval by the administrator is not obtained.

The error screen 1000 of FIG. 10 may be displayed on the operation panel 202 under control of the CCS 114, for example, when information input to the administrator approval screen 800 of FIG. 8 indicates that authentication is not successful. The error screen 1000 may include a display area 1002, which includes a message section 1004, an update information screen 1006, and an approval section 1008. The message section 1004 displays a message indicating that authentication of the administrator fails. The update information section 1006 displays information regarding the contents to be updated, for example, the version number of the current system, and the version number of the system to be updated. The approval section 1008 allows the user to repeat authentication process, when it is pressed or touched. For example, when selected, the administrator approval screen 800 of FIG. 8 may be displayed.

When the process of obtaining approval from the administrator is started, for example, when the administrator approval screen 800 of FIG. 8 is displayed, the image forming apparatus 100 may start counting a time period by resetting the value of a timer. When approval from the administrator is not obtained within a predetermined time period previously set, the image forming apparatus 100 may terminate the process of obtaining approval from the administrator. Alternatively, when approval from the administrator is not obtained within a predetermined time period previously set, the image forming apparatus 100 may only allow the image forming apparatus 100 to activate with the current configuration without updating.

Alternatively, when the process of obtaining approval from the administrator is started, the image forming apparatus 100 may start counting a number of tries by resetting the value of a retry counter. For example, when the number of inputting a set of the login name and the password reaches a predetermined value, the image forming apparatus 100 may terminate the process of obtaining approval from the administrator or only allow the image forming apparatus 100 to activate with the current configuration without updating.

Numerous additional modifications and variations are possible in light of the above teachings. It is therefore to be understood that within the scope of the appended claims, the disclosure of the present invention may be practiced otherwise than as specifically described herein.

With some embodiments of the present invention having thus been described, it will be obvious that the same may be varied in many ways. Such variations are not to be regarded as a departure from the spirit and scope of the present invention, and all such modifications are intended to be included within the scope of the present invention.

For example, elements and/or features of different illustrative embodiments may be combined with each other and/or substituted for each other within the scope of this disclosure and appended claims. Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, involatile memory cards, ROM (read-only-memory), etc. Further, the above-described and other methods of the present invention may be written using any desired programming language, including the legacy programming language such as the assembler, C, C++, or Java, or the object-oriented programming language.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

What is claimed is:

1. An image forming apparatus, comprising:
a first storage configured to store first configuration information regarding a first configuration of the image forming apparatus from a removable memory;
a second storage configured to store second configuration information regarding a second configuration of the image forming apparatus, the second configuration being currently set as a current configuration of the image forming apparatus;
an approval obtainer configured to obtain an approval result indicating whether an approval for updating the current configuration from the second configuration to the first configuration is obtained from an authorized user, the approval obtainer including one or more service modules that control a process of authenticating the authorized user and obtaining the approval from the authorized user;
a middleware system including a first service module that controls an operation panel, a second service module that manages network communication, a third service module that manages log data, and the approval obtainer; and
an activation controller configured to compare between the first configuration information and the second configuration information to generate a comparison result, to cause only the approval obtainer to be activated to obtain the approval result when the comparison result indicates that the first configuration information and the second configuration information are different from each other, to prohibit activation of the first service module, which controls the operation panel, of the middleware system until the comparison result between the first configuration information and the second configuration information has been generated, and then to activate the first service module, which controls the operation panel, to prompt for login information and the approval result, and to activate the image forming apparatus with one of the first configuration and the second configuration based on the approval result.

2. The apparatus of claim 1, wherein the activation controller is further configured to update the current configuration from the second configuration to the first configuration and reboot a system to activate the image forming apparatus with the first configuration when the approval result indicates that updating the current configuration is approved by the authorized user.

3. The apparatus of claim 2, wherein the activation controller is further configured to determine whether to reboot the system without updating the current configuration when the approval result indicates that updating the current configuration is not approved by the authorized user.

4. The apparatus of claim 1, wherein the operation panel is configured to display a screen.

5. The apparatus of claim 4, further comprising:
a network interface configured to allow the image forming apparatus to communicate via a network,
wherein the second service module controls the network interface.

6. The apparatus of claim 5, further comprising:
a third storage configured to store the log data.

7. The apparatus of claim 1, wherein
the middleware system further includes a fourth service module that controls a memory resource, a fifth service module that controls an engine, a sixth service module that controls facsimile communication, a seventh service module that controls system resources, and an eighth service module that controls image memory, and the activation controller is further configured to prohibit activation of at least one of the fourth, fifth, sixth, seventh, and eighth service modules of the middleware system until the approval result is obtained by the approval obtainer.

8. The apparatus of claim 1, wherein
the activation controller is configured to prohibit activation of the first service module and one of the second and third service modules of the middleware system until the approval result is obtained by the approval obtainer.

9. The apparatus of claim 1, wherein
the approval obtainer obtains the approval result via the network communication, which is managed by the second service module.

10. A method of activating an image forming apparatus, the method comprising:
obtaining first configuration information regarding a first configuration of the image forming apparatus from a removable memory;
obtaining second configuration information regarding a second configuration of the image forming apparatus from a non-volatile memory, the second configuration being currently set as a current configuration of the image forming apparatus;
obtaining, using an approval obtainer, an approval result indicating whether an approval for updating the current configuration from the second configuration to the first configuration is obtained from an authorized user, the approval obtainer including one or more service modules that control a process of authenticating the authorized user and obtaining the approval from the authorized user;
providing a middleware system including a first service module that controls an operation panel, a second service module that manages network communication, a third service module that manages log data, and the approval obtainer;
comparing between the first configuration information and the second configuration information to generate a comparison result;
activating, when the comparison result indicates that the first configuration information and the second configuration information are different from each other, only the approval obtainer to obtain the approval result indicating whether the approval for updating the current configuration from the second configuration to the first configuration is obtained from the authorized user;
prohibiting activation of the first service module, which controls the operation panel, of the middleware system until the comparison result between the first configuration information and the second configuration information has been generated, and then activating the first service module, which controls the operation panel, to prompt for login information and the approval result; and
activating the image forming apparatus with one of the first configuration and the second configuration based on the approval result.

11. The method of claim 10, further comprising:
updating the current configuration from the second configuration to the first configuration; and
rebooting a system to activate the image forming apparatus with the first configuration,
wherein the updating and the rebooting are performed when the approval result indicates that updating the current configuration is approved by the authorized user.

12. The method of claim 11, further comprising:
determining whether to reboot the system without updating the current configuration when the approval result indicates that updating the current configuration is not approved by the authorized user.

13. The method of claim 11, further comprising:
displaying an authentication screen to authenticate a user to determine whether the user is the authorized user to generate an authentication result,
wherein the updating and the rebooting are performed when the authentication result indicates that the user is the authorized user.

14. A non-transitory computer readable recording medium including computer program instructions which cause a computer to execute a method of activating an image forming apparatus, the method comprising:
obtaining first configuration information regarding a first configuration of the image forming apparatus from a removable memory;
obtaining second configuration information regarding a second configuration of the image forming apparatus from a non-volatile memory, the second configuration being currently set as a current configuration of the image forming apparatus;
obtaining an approval result, using an approval obtainer, indicating whether an approval for updating the current configuration from the second configuration to the first configuration is obtained from an authorized user, the approval obtainer including one or more service modules that control a process of authenticating the authorized user and obtaining the approval from the authorized user;
providing a middleware system including a first service module that controls an operation panel, a second service module that manages network communication, a third service module that manages log data, and the approval obtainer;
comparing between the first configuration information and the second configuration information to generate a comparison result;
activating, when the comparison result indicates that the first configuration information and the second configuration information are different from each other, only the approval obtainer to obtain the approval result indicating whether the approval for updating the current configuration from the second configuration to the first configuration is obtained from an authorized user;
prohibiting activation of the first service module, which controls the operation panel, of the middleware system until the comparison result between the first configuration information and the second configuration information has been generated, and then activating the first service module, which controls the operation panel, to prompt for login information and the approval result; and
activating the image forming apparatus with one of the first configuration and the second configuration based on the approval result.

15. The medium of claim 14, wherein the method of activating the image forming apparatus further comprises:
updating the current configuration from the second configuration to the first configuration; and
rebooting a system to activate the image forming apparatus with the first configuration, wherein the updating and the rebooting are performed when the approval result indicates that updating the current configuration is approved by the authorized user.

16. The medium of claim 15, wherein the method of activating the image forming apparatus further comprises:
determining whether to reboot the system without updating the current configuration when the approval result indicates that updating the current configuration is not approved by the authorized user.

* * * * *